(12) United States Patent
Le et al.

(10) Patent No.: US 11,864,561 B1
(45) Date of Patent: Jan. 9, 2024

(54) MULTIPURPOSE FERTILIZER COMPOSITION HAVING ANTI-INSECT PROPERTIES, WATER-RETAINING, AND CAPABLE OF IMPROVING TO ABSORB MICRONUTRIENTS FOR PLANTS

(71) Applicant: Thanh Duc Le, Ho Chi Minh (VN)

(72) Inventors: Thanh Duc Le, Ho Chi Minh (VN); Cu Van Bui, Binh Duong (VN); Thuan Dac Ngo, Ho Chi Minh (VN)

(73) Assignee: THANH DUC LE, Ho Chi Minh (VN)

( * ) Notice: Subject to any disclaimer, the term of this patent is extended or adjusted under 35 U.S.C. 154(b) by 0 days.

(21) Appl. No.: 18/342,757

(22) Filed: Jun. 28, 2023

(51) Int. Cl.
| | |
|---|---|
| *A01N 65/38* | (2009.01) |
| *A01N 43/40* | (2006.01) |
| *A01N 65/08* | (2009.01) |
| *C05G 3/00* | (2020.01) |
| *C05D 9/02* | (2006.01) |
| *C05B 15/00* | (2006.01) |
| *C05F 3/00* | (2006.01) |
| *C05F 17/20* | (2020.01) |
| *A01N 65/26* | (2009.01) |
| *C05F 11/02* | (2006.01) |

(52) U.S. Cl.
CPC ........... *A01N 65/385* (2013.01); *A01N 43/40* (2013.01); *A01N 65/08* (2013.01); *A01N 65/26* (2013.01); *C05B 15/00* (2013.01); *C05D 9/02* (2013.01); *C05F 3/00* (2013.01); *C05F 11/02* (2013.01); *C05F 17/20* (2020.01); *C05G 3/00* (2013.01)

(58) Field of Classification Search
None
See application file for complete search history.

(56) References Cited

U.S. PATENT DOCUMENTS

2023/0232840 A1 * 7/2023 Johnston ................ A01N 65/44
424/76.1

FOREIGN PATENT DOCUMENTS

| CN | 104030819 A | * | 9/2014 | ............... C05G 3/00 |
| CN | 105948960 A | * | 9/2016 | ............... C05D 9/00 |
| CN | 113135795 A | * | 7/2021 | ............... C05F 17/20 |
| WO | WO 2009/135049 A1 | * | 11/2009 | ............ C08F 220/12 |

* cited by examiner

*Primary Examiner* — Wayne A Langel (57) ABSTRACT

A multipurpose fertilizer composition having anti-insect properties, water-retaining, and capable of improving to absorb micronutrients for plants obtained from the process of forming a homogeneous mixture by mixing a fertilizer mixture with at least three other ingredients including a chelation of trace elements solution, a water-retaining ingredient, and a plant extracts ingredients having anti-insect properties; wherein the chelation of trace elements solution having 5%-7% of the weight of the fertilizer mixture; the water-retaining ingredient having 7%-10% of the total weight of the fertilizer mixture, and the chelation of trace elements solution; the plant extracts ingredients having anti-insect properties having 0.08%-3% of the total weight of the fertilizer mixture, with the chelation of trace elements solution, and the water-retaining ingredient.

20 Claims, 2 Drawing Sheets

FIG. 1

A first formula of D

A second formula of D

A third formula of D

A forth formula of D

FIG. 2

MULTIPURPOSE FERTILIZER COMPOSITION HAVING ANTI-INSECT PROPERTIES, WATER-RETAINING, AND CAPABLE OF IMPROVING TO ABSORB MICRONUTRIENTS FOR PLANTS

FIELD OF THE INVENTION

The present invention relates to the field of fertilizer production, specifically relating to a fertilizer production process applied to keeping plants moist during drought and water shortages and soil improvement. More specifically, the present invention relates to a multipurpose fertilizer composition having anti-insect properties, water-retaining, and capable of improving to absorb micronutrients for plants.

BACKGROUND ART

In addition to the positive side such as promoting and increasing crop yields, using inorganic fertilizers for plants has a quick effect but cannot be maintained for a long time, sustainability is not available. Improper use, incorrect dosage, wrong time, wrong type and abuse of inorganic fertilizers have adversely affected the soil, plants, environment and people, such as most of inorganic fertilizers are derived from acids, so they will sour the soil, reduce the pH, poison the soil, accumulate heavy metals, and break down the soil structure. The inorganic fertilizers cause environmental pollution, ecological imbalance, increase the susceptibility of plants to diseases because they destroy useful microorganisms (VSV) in the soil. The inorganic fertilizers also cause damage to the roots, affecting the absorption of nutrients and creating conditions for disease invasion. Beside the quality of agricultural products is reduced due to the large amount of chemical residues in the plants, leading to harmful effects on the health of consumers such as causing methaemoglobin diseases and potential cancer if ate food containing $NO_2-$ and $NO_3-$, and many other diseases encountered when eating crops contaminated with chemicals from fertilizers. From the negative effects of inorganic fertilizers, which create impetus for agriculture, there is gradually a shift towards organic farming, without the use of inorganic fertilizers, pesticides, stimulants and genetically modified organisms.

Nicotine of molecular formula $C_{10}H_{14}N_2$, by pyridine and two heterocycles of N-methyl Pyrrolidine, formed, be a kind of main alkaloid in tobacco, be colourless or pale yellow oily liquid body, 247° C. of boiling points, in water soluble, ethanol, ether and sherwood oil. The purposes of natural nicotine is very extensive, as a residue ingredient, an effective non-harmful insecticide that can be used for the edible farm crop such as grain, oil plant, vegetables, fruit, be simultaneously also important medicine intermediate, can be used as producing the extraordinary raw material of the illness such as cardiovascular, poisonous snake and insect bite wound. The tobacco waste including leaf veins, stems, roots, and leaves have been removed, all contain a large amount of nutrient substances such as saccharides, pectin, nicotine, cellulose, polyphenol, solanesol, crude protein, N, P, K and the like, so said the tobacco waste are rare resources. Through simple incineration treatment, on one hand, a certain influence is exerted on the environment, and on the other hand, a large amount of nutrient substances in the tobacco waste are wasted.

Chelates are generally compounds that increase the amount of easily absorbed substances for plants, especially trace elements. If the nutrient solution/fertilizer lacks chelate, the plant may fall into a state of deficiency of necessary trace elements, thereby inhibiting the growth of the plant under extreme conditions. Currently, there are two types of chelate commonly used in fertilizers: synthetic chelates and organic chelates. For synthetic chelates, EDTA, DTPA, HEEDTA, CDTA, and EDDHA compounds are used for chelation reaction of trace elements; these bonds are very strong so it holds trace elements tightly and is difficult to release trace elements for plants to absorb. The effectiveness of synthetic chelates depends on the pH conditions of the nutrient solution/fertilizer. In addition, the synthetic chelates are only used in soil fertilizers, whereas foliar fertilizers are less effective. Overcoming the disadvantages of synthetic chelates, organic chelates take advantage of naturally occurring compounds such as fulvic acid, humic acid, etc. that are used for the chelation reaction of trace elements; these bonds easily release trace elements for plants to absorb. In addition, organic chelates remain effective at any pH condition, and are used both in the production of soil fertilizers and foliar fertilizers.

Due to many changes in weather and climate laws and the indiscriminate use of irrigation water sources, there have been, are, and will occur local droughts causing severe damage to crops. Suppose the maximum amount of water for crop irrigation is minimized, but their average growth and development are ensured. In that case, it will reduce the pressure on water resources in a densely populated country like Vietnam, especially in the dry season. In order to cultivate effectively during the dry season and limit the risks caused by drought, the use of methods to reduce the water evaporation rate and increase the soil's water holding capacity is considered one of the solutions. Most effective method. In addition to measures such as watering sparingly, mulching the soil (covering the soil), applying organic fertilizers, and choosing drought-resistant crops, one of the measures that prove to be highly effective is the application of a humectant to fertilize the soil to increase the water holding capacity of the soil and help plants increase biomass and yield in arid conditions.

According to Patent No. CN113135795, the invention refers to a tobacco waste treatment method is characterized by comprising the following steps:
step 1) crushing the waste tobacco leaves after redrying in a tobacco redrying plant into tobacco leaf powder;
step 2) uniformly mixing the tobacco powder, the livestock manure and the humic acid according to a preset proportion, adding a fermentation microbial inoculum, and adjusting the humidity of the material to 45-55%;
step 3) fermentation management:
  the central temperature of the material rises to more than 50° C., the pile is turned once every two days, and the humidity of the material is maintained at 45-55%;
  the central temperature of the material rises to 60° C.-73° C., and the material starts to be turned over once a day, and the humidity of the material is maintained at 45-55%;
  lowering the central temperature of the material to below 50° C., stopping moisturizing, and turning the pile once a day; and
step 4) continuously fermenting until the central temperature of the material is reduced to below 45° C., the moisture is reduced to below 35%, and finishing the fermentation.

According to Patent No. CN104030819, the invention refers to a moisturizing fertilizer, which includes the following ingredients by weight: 35-56 parts inorganic fertilizer, 20-40 parts organic fertilizer, 5-10 parts sodium humate, 1-6 parts acrylic acid-acrylamide, 1-6 parts ammonium magnesium phosphate and 4-16 parts packed. Moisturizing fertilizer disclosed by the invention, the inorganic-organic compound in fertilizer is taken as the inner core, ammonium magnesium phosphate is taken as an immediate layer, and acrylic acid compound absorbent material-acrylamide and sodium humate are taken as the outer layer.

According to Patent No. CN105948960, the invention discloses a composite natural nicotine fertilizer and a preparation method thereof. The composite natural nicotine fertilizer comprises the following components in parts by weight: 15-25 parts of tea bran, 8-16 parts of peanut bran, 40-56 parts of organic fertilizer, 15-25 parts of nicotine extract, and 4-10 parts of adhesive. The obtained composite natural nicotine fertilizer can be used for keeping paddy rice, vegetables, garden flowers and other crops from soil insects, nematodes, ground pests with piercingsucking mouthparts, such as plant hopper, aphid, whitefly, thrips and the like.

The above inventions meet the specific purposes and requirements of a technical solution. The technical solutions that only refer to properties of fertilizers not only to providing nutrients, but also combining only one feature is selected in the features including: anti-insect, water-retaining, and capable of improving to absorb micronutrients for plants under organic chelates. However, the technical solutions do not disclose a multipurpose fertilizer composition that integrates all the properties including anti-insect, water-retaining, providing nutrients, and capable of improving to absorb micronutrients for plants under organic chelates.

Therefore, it is necessary to create a multipurpose fertilizer composition containing a plant extracts ingredients having anti-insect properties; wherein the plant extracts ingredients having a natural nicotine can be used for keeping paddy rice, vegetables, garden flowers and other crops from soil insects, nematodes, ground pests with piercingsucking mouthparts, such as plant hopper, aphid, whitefly, thrips and the like.

Furthermore, it is necessary to create a multipurpose fertilizer composition containing organic chelates for capable of improving to absorb micronutrients for plants; wherein organic chelates created by mixing the extracts fulvic acid, humic acid from peat with trace elements extracted from katuk/star gooseberry/sweet leaves (Sauropus androgynous), kale leaves, and rare earth.

It is necessary to create a multipurpose fertilizer composition containing the water-retaining ingredient created by performed in a specific order from (a') to (b') comprising:
(a') preparing a pectin extracts by steps comprising:
creating a raw pectin extracts mixture by mixing 1 part a pectin extract from coffee husks and cocoa shells, with 2 parts a pectin extract from yam (*Dioscorea alata* L.), and 3 parts a pectin extract from okra (*Abelmoschus esculentus* (L.) Moench);
precipitation with isopropanol in the ratio of 1 part the raw pectin with 2 parts isopropanol at the temperature of 90° C.-95° C. for 90-100 minutes; then centrifuging at 400-500 rpm for 20-30 minutes; to create a precipitate solution;
filtering and washing the precipitate solution with ethanol 70% until the precipitate solution having white; then drying at 50° C.-60° C. for 20-24 hours to create the pectin extracts having moisture content of 7%-9%; and
(b') creating the water-retaining ingredient by steps comprising:
gelatinizing the pectin extracts for 5-7 minutes at 70° C.-75° C.;
adding acetyl peroxide with the combination of stirring at 85° C. for 40 minutes; wherein Acetyl peroxide having concentration of 0.1%-0.3%;
adding acrylic acid with the combination of stirring at 40° C. for 20 minutes;
adding 1,4-butanediol diacrylate with the combination of stirring at 55° C.-60° C. for 5 minutes, then drying at 65° C. to constant weight to obtain the water-retaining ingredient.

Finally, it is necessary to create a multipurpose fertilizer composition having effects combined valuable properties that have contributed to reducing the use of chemical fertilizers, increasing the quality of agricultural products, preserving soil fertility, and limiting pollution of agricultural land, pollution of groundwater, and river systems.

The invention provides solutions to achieve the above objectives.

SUMMARY OF THE INVENTION

Accordingly, an objective of the present invention is to provide a multipurpose fertilizer composition having anti-insect properties, water-retaining, and capable of improving to absorb micronutrients for plants obtained from the process of forming a homogeneous mixture by mixing a fertilizer mixture with at least three other ingredients including a chelation of trace elements solution, a water-retaining ingredient, and a plant extracts ingredients having anti-insect properties; wherein the chelation of trace elements solution having 5%-7% of the weight of the fertilizer mixture; the water-retaining ingredient having 7%-10% of the total weight of the fertilizer mixture, and the chelation of trace elements solution; the plant extracts ingredients having anti-insect properties having 0.08%-3% of the total weight of the fertilizer mixture, with the chelation of trace elements solution, and the water-retaining ingredient.

Another objective of the present invention is to provide a second after incubated mixture created by performed in a specific order from (i) to (iii) comprising:
(i) creating a base mixture by mixing a manure, a poultry manure, and a tobacco waste in a ratio of 2:1:4; then crushing to size less than 0.05 mm; wherein the manure, and the poultry manure having moisture content of 42%-45%;
the manure is selected from one or a combination of cow manure, pig manure, horse manure, goat manure, and sheep manure; wherein cow manure having at least 28% of the weight of the manure;
the poultry manure is selected from one or a combination of chicken manure, duck manure, geese manure, pigeon manure, and quail droppings; wherein chicken manure having at least 28% of the weight of the poultry manure;
wherein the tobacco waste including leaf veins, stems, roots, and leaves have been removed;
(ii) admixing a microorganism ingredient into a extracted residue mixture, then incubating at 45° C.-60° C. for 5 hours to create a first after incubated mixture; wherein microorganism ingredient having 0.05% of the weight of the extracted residue mixture; and
(iii) admixing the base mixture, the first after incubated mixture, and the microorganism ingredient in the ratio of 90:10:1, then incubating at 45° C.-60° C. for 25-28 days with humidity of 60%-65%, with the combination of mixing frequency every one day for 20 minutes; that to create the second after incubated mixture.

Yet another objective of the present invention is to provide the second after incubated mixture consisting of chemical components: an elemental nitrogen (N) having 1.77% by weight; an elemental phosphorus (P) having 0.69% by weight; an elemental potassium (K) having 5.4% by weight; an elemental sulfur (S) having 0.39% by weight; an elemental bo (B) having 0.0409% by weight; an elemental calcium (Ca) having 2.82% by weight; an elemental magnesium (Mg) having 0.49% by weight; an elemental copper (Cu) having 0.0024% by weight; an elemental zinc (Zn) having 0.0047% by weight; an elemental manganese (Mn) having 0.0149% by weight; an elemental iron (Fe) having 0.119% by weight; nitrogen-fixing microorganisms having $1.1 \times 10^6$ CFU/g; phosphate solubilizing microorganisms (PSMs) having $2.1 \times 10^5$ CFU/g; cellulose-degrading microorganisms having $7.1 \times 10^5$ CFU/g; humic acid having 2.09% by weight; and organic matter having 86.5% by weight.

Another objective of the present invention is to provide a chelation of trace elements solution by steps comprising:

creating a extract from katuk/star gooseberry/sweet leaves (Sauropus androgynous) and kale leaves by extracted from katuk/star gooseberry/sweet leaves (Sauropus androgynous) and kale leaves fresh are crushed/chopped/cut, then soaking in a in solvent, or saturated brine solution for 2 hours; wherein a ratio of mixing the katuk/star gooseberry/sweet leaves (Sauropus androgynous) with kale leaves is 1:3;

creating a trace solution by mixing the extract from katuk/star gooseberry/sweet leaves (Sauropus androgynous) and kale leaves with a micronutrient extracts from rare earth in the ratio 1:1; wherein the micronutrient extracts from rare earth having pH of 6.2, and obtained by combining treatment with dilute HNO3 55% and aqua regia solution;

grinding peat to obtain a peat powder; wherein said peat has been treated bituminous, and having moisture content of 30%-35%;

treating the peat powder with NaOH 10% in the ratio 1:3 for 60 minutes; then filtering to obtain a first temporary solution, and a first temporary residue;

treating the first temporary residue with NaOH 50% in the ratio 1:2 for 30 minutes; then filtering to obtain a second temporary solution, and a second temporary residue;

treating the second temporary residue with acid solution having 50% concentration in a ratio of 1:1.5 for 30 minutes; then filtering to obtain a third solution, and a treated peat residue; wherein acid solution used is selected from one of the following acids: acetic acid, HCl acid, and $HNO_3$ acid;

admixing the first solution with the second solution, and the third solution to create a base solution; and admixing the trace solution and the base solution in the ratio 1:(1-3), with the combination of stirring to create the chelation of trace elements solution.

In view of the foregoing, another objective of the present invention is to provide a plant extracts ingredients having anti-insect properties is obtained by mixing homogenizing a tobacco waste extracts solution with at least one ingredients is a plant mixture extracts solution;

the tobacco waste extracts solution extracted from fresh, or dried, crushed/chopped/cut tobacco waste, soaked in ethanol 98% at 30° C.-45° C. for 7 days, with the combination of stirring once/day for 10 minutes, then filtered and separated an extracted waste tobacco residues; wherein a ratio of soaking the tobacco waste and ethanol 98% having 3:10; wherein the tobacco waste including leaf veins, stems, roots, and leaves have been removed;

the plant mixture extracts solution created by performed in a specific order from (a) to (f) comprising:
(a) preparing plant mixture consisting of green tomatoes, sprouted potatoes, eggplants, chilli/peppers/bell pepper, and pond apple seeds (*Annona glabra* seeds); all are chopped and mixed in the respective ratio of 1:1:1:1:1;
(b) soaking said chopped plant mixture with ethanol 70% in a ratio of 1:5 at room temperature, with the combination of stirring at 100 rpm for 3 days;
(c) filtering said soaked plant mixture to obtained a first solution, and a first residue;
(d) soaking the first residue with ethanol 70% in a ratio of 1:5 at room temperature, with the combination of stirring at 100 rpm for 3 days;
(e) filtering said soaked first residue to obtained a second solution, and an extracted plant mixture residue; wherein the filter hole diameter at step (e) is 25% smaller than the filter hole diameter at step (c); and
(f) mixing homogenizing the first solution with the second solution to obtain the plant mixture extracts solution.

Finally, the purpose of the invention is to provide a the fertilizer mixture is obtained by mixing at least two ingredients from three ingredients comprising a base fertilizer, a NPK fertilizer, and a foundation fertilizer; the base fertilizer comprising chemical components: organic matter having 70.4% by weight, an elemental nitrogen (N) having at least 0.25% by weight, an elemental phosphorus (P) having at least 0.69% by weight, and an elemental potassium (K) having at least 5.4% by weight, an elemental sulfur (S) having at least 0.000005% by weight, an elemental bo (B) having at least 0.003% by weight, an elemental calcium (Ca) having at least 0.025% by weight, and an elemental magnesium (Mg) having at least 0.0113% by weight.

These and other advantages of the present invention will no doubt become obvious to those of ordinary skill in the art after having read the following detailed description of the preferred embodiments, which are illustrated in the various drawing Figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
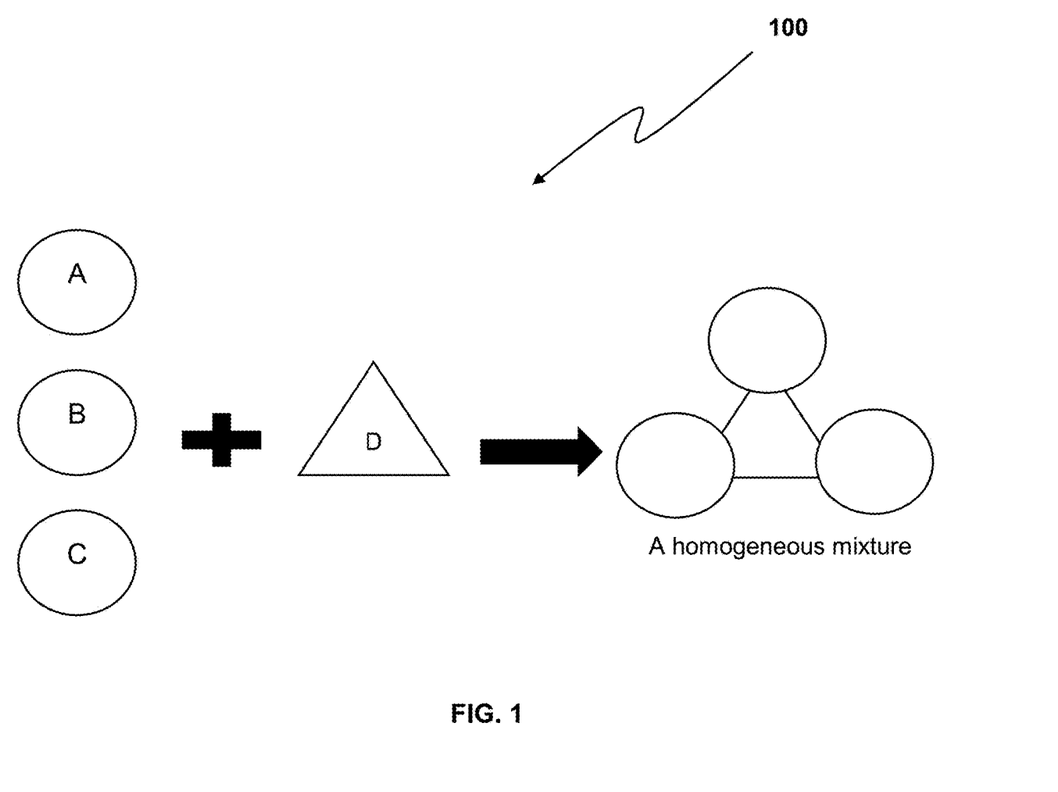
FIG. 1 is a conceptual block diagram illustrating the principle of making the multipurpose fertilizer composition having anti-insect properties, water-retaining, and capable of improving to absorb micronutrients for plants with an exemplary embodiment of the present invention.

One embodiment of the invention is now described with reference to FIG. 1. FIG. 1 illustrating the principle of making illustrates a conceptual block diagram of method 100 to create a homogeneous mixture. The homogeneous mixture is obtained by mixing homogenizing a fertilizer mixture (D) with at least three other ingredients including a chelation of trace elements solution (A), a water-retaining ingredient (B), and a plant extracts ingredients having anti-insect properties (C) having the correct percentage (%) by weight.

In the embodiment of the present invention, percent mass or percentage (%) by weight=(mass of solute/mass of solution)×100%. The unit of mass is usually grams. Mass percent is also known as the correct percentage by weight or w/w %. It should also be noted that the molar mass is also within the meaning of the invention. Molar mass is the total mass of all atoms in a mole of compound. Total all volume percentages add up to 100%.

According to the preferred embodiment of the present invention, (A) having 5%-7% of the weight of (D); (B) having 7%-10% of the total weight of (D) and (A); and (C) having 0.08%-3% of the total weight of (D) with (A) and (B).

In many aspects of the present invention, a homogeneous mixture is defined as a mixture with the following functions: (1) increasing water-retaining, and anti-insect activity; (2) improving to absorb micronutrients for plants under organic chelates; and (3) acting as a reactant to uniformly dissolve the extract components and other complementary substances (%) by weight. Consequently, a homogeneous mixture is created as a reactant allowing additives, emulsifiers, osmotic agents, polar solvents, phospholipids, anti-caking agent, and other plant extract to be mixed to form ingredients anti-insect properties, water-retaining, and improving to absorb micronutrients for plants according to the invention.

Within the scope of the present invention, the term "a homogeneous mixture" includes the following meanings:
(a) A homogeneous mixture is a solution/or mixture that completely dissolves/mixing homogenizing the composition of a fertilizer mixture (D) with at least three other ingredients including a plant extracts ingredients having anti-insect properties (A), a water-retaining ingredient (B), and a chelation of trace elements solution (C) having the correct a predetermined ratio;
(b) A homogeneous mixture is a solution mixture/or solid mixture depends on whether the fertilizer mixture (D) is liquid or solid form;
(c) A homogeneous mixture is act as a reactant, allowing the addition of ingredients to contribute their chemical and physical properties to create a new preparation; and
(d) A homogeneous mixture chemically bonds with other complementary ingredients including but not limited such as ionization reactions, covalent reactions, reducing reactions, replacement reactions, and rearrangement reactions to form a new chemical composition.

It should also be noted that the term "mixing homogenizing" is used in the invention understood to mean the uniform distribution, or complete dissolution of, substances present in a solution/mixture.

As the plant extracted in the present invention, an "extracts" extracted as an active compound contained in any of the plants mentioned. The plant extract in an active compounds sense obtained by steam distillation from the above plants or dried materials thereof is preferably used as the "extracts" in the present invention, but is not limited thereto. For example, active compounds extracted from the plants by using other methods such as extraction or expression are also included in the "extracts" of the present invention as long as they contain extracted components (such as active compounds). Other methods for extracting active compounds from plants, for example, solvent extraction (such as alcohol extraction, organic solvent extraction), oil and fat adsorption extraction (hot enfleurage or cold enfleurage), and supercritical fluid extraction are known. Examples of the solvent used for extraction include, but are not limited to, alcohols such as ethanol, methanol, propanol, isopropanol, and butanol, and organic solvents including relatively high polarity solvents such as acetone and low polarity solvents such as hexane. The "extracts" in the present invention may be those in which the active compounds obtained by the above method is further purified and concentrated by using various purification procedures such as hydrophobic or adsorptive chromatography using a support such as porous beads, silica gel, or alumina.

Figure 2:
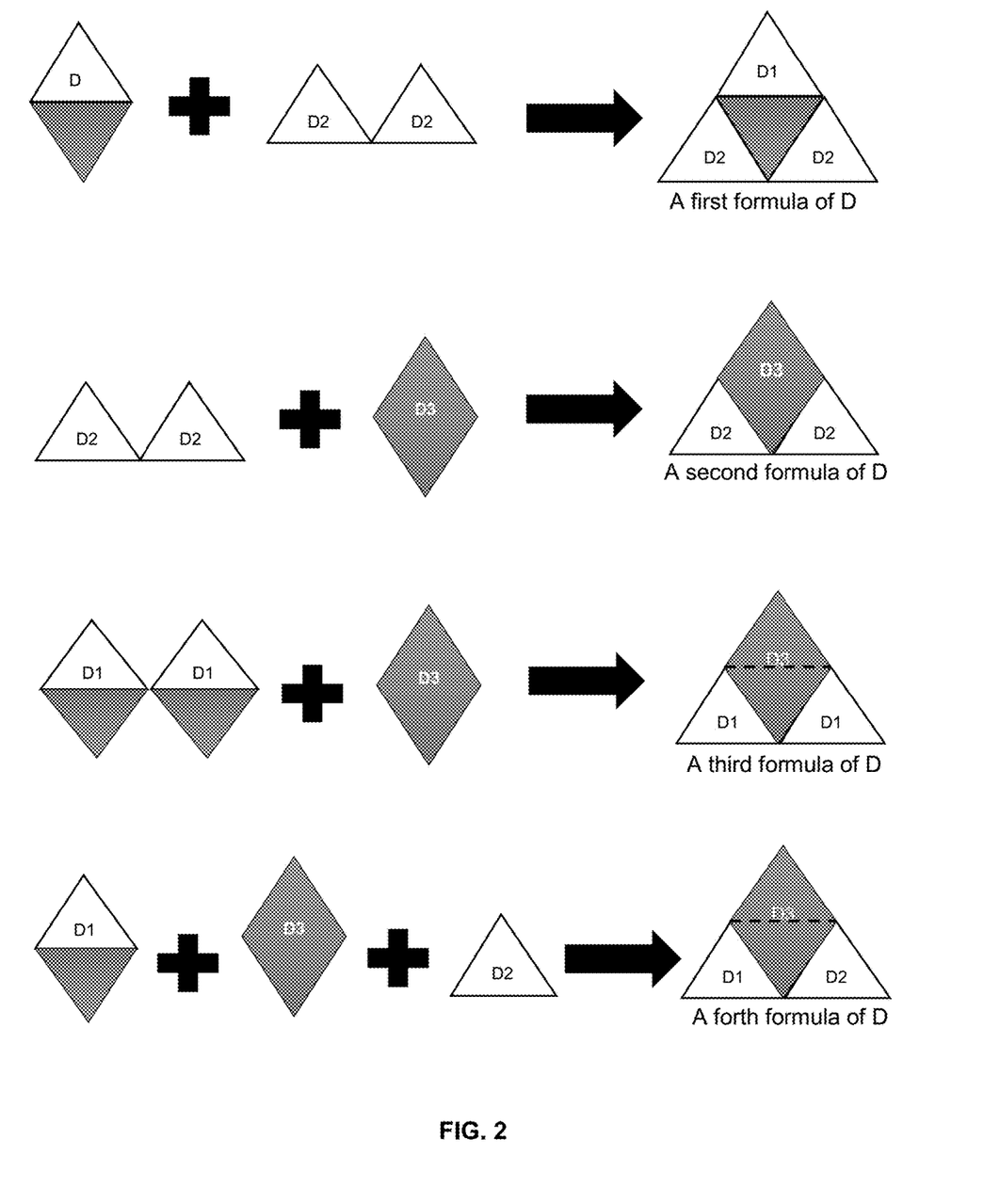
FIG. 2 is a conceptual block diagram illustrating the principle of making four formulas of the fertilizer mixture (D) according to the embodiment of the present invention.

Referring to FIG. 2, the fertilizer mixture (D) is obtained by mixing at least two ingredients from three ingredients comprising a base fertilizer (D1), a NPK fertilizer (D2), and a foundation fertilizer (D3).

According to the embodiment of the present invention, the fertilizer mixture (D) is obtained depend on the ratio of the weight of each ingredient D1-D3, including a first formula, a second formula, a third formula, and a fourth formula; wherein the fourth formula is better than the third formula, the third formula is better than the second formula, and the second formula is better than the first formula. The comparative factor is anti-insect properties, water-retaining, and capable of improving to absorb micronutrients for plants surveyed when each formula mixing homogenizing with plant extracts ingredients having anti-insect properties (A), a water-retaining ingredient (B), and a chelation of trace elements solution (C) to create the homogeneous mixture.

According to the embodiment of the present invention, the first formula comprising 1 part the base fertilizer (D1), 2 parts the NPK fertilizer (D2), and 0 part the foundation fertilizer (D3).

According to the embodiment of the present invention, the second formula comprising 0 part the base fertilizer (D1), 2 parts the NPK fertilizer (D2), and 1 part the foundation fertilizer (D3).

According to the embodiment of the present invention, the third formula comprising 2 parts the base fertilizer (D1), 0 part the NPK fertilizer (D2), and 1 part the foundation fertilizer (D3).

According to the embodiment of the present invention, the fourth formula comprising 1 part the base fertilizer (D1), 1 part the NPK fertilizer (D2), and 1 part the foundation fertilizer (D3).

According to the embodiment of the present invention, the base fertilizer (D1) comprising chemical components: organic matter having 70.4% by weight, an elemental nitrogen (N) having at least 0.25% by weight, an elemental phosphorus (P) having at least 0.69% by weight, and an elemental potassium (K) having at least 5.4% by weight, an elemental sulfur (S) having at least 0.000005% by weight, an elemental bo (B) having at least 0.003% by weight, an elemental calcium (Ca) having at least 0.025% by weight, and an elemental magnesium (Mg) having at least 0.0113% by weight.

According to the embodiment of the present invention, the foundation fertilizer (D3) is obtained by creating a second after incubated mixture, then centrifuged, or shaping the second after incubated mixture.

According to the embodiment of the present invention, the foundation fertilizer (D3) in liquid form is obtained by centrifuging three times the second after incubated mixture to create a after centrifuged solution, then adjusting the pH of the after centrifuged solution having 6.2-7 to create the foundation fertilizer in liquid form; wherein before each centrifugation, adding water to soaking for 20 minutes, with the combination of stirring for 5 minutes.

According to the embodiment of the present invention, the foundation fertilizer (D3) in solid form is obtained by shaping the second after incubated mixture after adjusting the pH at 6.2-7, and moisture content of less than 13%. It should also be noted that the term "the foundation fertilizer (D3) in solid form" used in the present invention is also defined as the state of foundation fertilizer (D3) including but not limited to powder, pellets, và granules.

According to the embodiment of the present invention, the second after incubated mixture created by performed in a specific order from (i) to (iii) comprising:
  (i) creating a base mixture by mixing a manure, a poultry manure, and the tobacco waste in a ratio of 2:1:4; then crushing to size less than 0.05 mm;
    wherein the manure, and the poultry manure having moisture content of 42%-45%;
    the manure is selected from one or a combination of cow manure, pig manure, horse manure, goat manure, and sheep manure; wherein cow manure having at least 28% of the weight of the manure;
    the poultry manure is selected from one or a combination of chicken manure, duck manure, geese manure, pigeon manure, and quail droppings; wherein chicken manure having at least 28% of the weight of the poultry manure;
    wherein the tobacco waste including leaf veins, stems, roots, and leaves have been removed;
  (ii) admixing a microorganism ingredient into a extracted residue mixture, then incubating at 45° C.-60° C. for 5 hours to create a first after incubated mixture; wherein microorganism ingredient having 0.05% of the weight of the extracted residue mixture;
    wherein the extracted residue mixture comprising: the extracted waste tobacco residues, the extracted plant mixture residue, the treated peat residue, the coffee husks and cocoa shells mixture residue, the pectin-reduced yams residue, and the pectin-reduced okra residue; and
  (iii) admixing the base mixture, the first after incubated mixture, and the microorganism ingredient in the ratio of 90:10:1, then incubating at 45° C.-60° C. for 25-28 days with humidity of 60%-65%, with the combination of mixing frequency every one day for 20 minutes; that to create a second after incubated mixture.

According to the embodiment of the present invention, the second after incubated mixture having a chemical components comprising: an elemental nitrogen (N) having 1.77% by weight; an elemental phosphorus (P) having 0.69% by weight; an elemental potassium (K) having 5.4% by weight; an elemental sulfur (S) having 0.39% by weight; an elemental bo (B) having 0.0409% by weight; an elemental calcium (Ca) having 2.82% by weight; an elemental magnesium (Mg) having 0.49% by weight; an elemental copper (Cu) having 0.0024% by weight; an elemental zinc (Zn) having 0.0047% by weight; an elemental manganese (Mn) having 0.0149% by weight; an elemental iron (Fe) having 0.119% by weight; nitrogen-fixing microorganisms having $1.1 \times 10^6$ CFU/g; phosphate solubilizing microorganisms (PSMs) having $2.1 \times 10^5$ CFU/g; cellulose-degrading microorganisms having $7.1 \times 10^5$ CFU/g; humic acid having 2.09% by weight; and organic matter having 86.5% by weight.

A multipurpose fertilizer composition having anti-insect properties, water-retaining, and capable of improving to absorb micronutrients for plants 200 ("composition 200") according to method 100 obtained from the process of forming a homogeneous mixture by mixing a fertilizer mixture (D) with at least three other ingredients including a plant extracts ingredients having anti-insect properties (A), a water-retaining ingredient (B), and a chelation of trace elements solution (C) having the correct a predetermined ratio; wherein the fertilizer mixture (D) is obtained by mixing at least two ingredients from three ingredients comprising a base fertilizer (D1), a NPK fertilizer (D2), and a foundation fertilizer (D3); in which the foundation fertilizer (D3) in liquid form obtained from the process of forming a second after incubated mixture, and then centrifuged three times the second after incubated mixture to create a after centrifuged solution, then adjusting the pH of the after centrifuged solution having 6.2-7 to create the foundation fertilizer in liquid form; wherein before each centrifugation, adding water to soaking for 20 minutes, with the combination of stirring for 5 minutes.

According to the embodiment of the present invention, the plant extracts ingredients having anti-insect properties (A) having 5%-7% of the weight of the fertilizer mixture (D).

According to the embodiment of the present invention, the water-retaining ingredient (B) having 7%-10% of the total weight of the fertilizer mixture (D) and the plant extracts ingredients having anti-insect properties (A).

According to the embodiment of the present invention, the chelation of trace elements solution (C) having 0.08%-3% of the total weight of the fertilizer mixture (D) with the plant extracts ingredients having anti-insect properties (A), and the water-retaining ingredient (B).

According to the embodiment of the present invention, the fertilizer mixture (D) is obtained depend on the ratio of the weight of each ingredient D1-D3, including a first formula, a second formula, a third formula, and a fourth formula; wherein the fourth formula is better than the third formula, the third formula is better than the second formula, and the second formula is better than the first formula. The comparative factor is anti-insect properties, water-retaining, and capable of improving to absorb micronutrients for plants surveyed when each formula mixing homogenizing with plant extracts ingredients having anti-insect properties (A), a water-retaining ingredient (B), and a chelation of trace elements solution (C) to create the homogeneous mixture.

According to the embodiment of the present invention, the first formula comprising 1 part the base fertilizer (D1), 2 parts the NPK fertilizer (D2), and 0 part the foundation fertilizer (D3).

According to the embodiment of the present invention, the second formula comprising 0 part the base fertilizer (D1), 2 parts the NPK fertilizer (D2), and 1 part the foundation fertilizer (D3).

According to the embodiment of the present invention, the third formula comprising 2 parts the base fertilizer (D1), 0 part the NPK fertilizer (D2), and 1 part the foundation fertilizer (D3).

According to the embodiment of the present invention, the fourth formula comprising 1 part the base fertilizer (D1), 1 part the NPK fertilizer (D2), and 1 part the foundation fertilizer (D3).

According to the embodiment of the present invention, the base fertilizer (D1) comprising chemical components: organic matter having 70.4% by weight, an elemental nitrogen (N) having at least 0.25% by weight, an elemental phosphorus (P) having at least 0.69% by weight, and an elemental potassium (K) having at least 5.4% by weight, an elemental sulfur (S) having at least 0.000005% by weight, an elemental bo (B) having at least 0.003% by weight, an elemental calcium (Ca) having at least 0.025% by weight, and an elemental magnesium (Mg) having at least 0.0113% by weight.

According to the embodiment of the present invention, the second after incubated mixture created by performed in a specific order from (i) to (iii) comprising:
(i) creating a base mixture by mixing a manure, a poultry manure, and the tobacco waste in a ratio of 2:1:4; then crushing to size less than 0.05 mm;
   wherein the manure, and the poultry manure having moisture content of 42%-45%;
   the manure is selected from one or a combination of cow manure, pig manure, horse manure, goat manure, and sheep manure; wherein cow manure having at least 28% of the weight of the manure;
   the poultry manure is selected from one or a combination of chicken manure, duck manure, geese manure, pigeon manure, and quail droppings; wherein chicken manure having at least 28% of the weight of the poultry manure;
   wherein the tobacco waste including leaf veins, stems, roots, and leaves have been removed;
(ii) admixing a microorganism ingredient into a extracted residue mixture, then incubating at 45° C.-60° C. for 5 hours to create a first after incubated mixture; wherein microorganism ingredient having 0.05% of the weight of the extracted residue mixture;
   wherein the extracted residue mixture comprising: the extracted waste tobacco residues, the extracted plant mixture residue, the treated peat residue, the coffee husks and cocoa shells mixture residue, the pectin-reduced yams residue, and the pectin-reduced okra residue; and
(iii) admixing the base mixture, the first after incubated mixture, and the microorganism ingredient in the ratio of 90:10:1, then incubating at 45° C.-60° C. for 25-28 days with humidity of 60%-65%, with the combination of mixing frequency every one day for 20 minutes; that to create a second after incubated mixture. The second after incubated mixture having a chemical components comprising: an elemental nitrogen (N) having 1.77% by weight; an elemental phosphorus (P) having 0.69% by weight; an elemental potassium (K) having 5.4% by weight; an elemental sulfur (S) having 0.39% by weight; an elemental bo (B) having 0.0409% by weight; an elemental calcium (Ca) having 2.82% by weight; an elemental magnesium (Mg) having 0.49% by weight; an elemental copper (Cu) having 0.0024% by weight; an elemental zinc (Zn) having 0.0047% by weight; an elemental manganese (Mn) having 0.0149% by weight; an elemental iron (Fe) having 0.119% by weight; nitrogen-fixing microorganisms having $1.1 \times 10^6$ CFU/g; phosphate solubilizing microorganisms (PSMs) having $2.1 \times 10^5$ CFU/g; cellulose-degrading microorganisms having $7.1 \times 10^5$ CFU/g; humic acid having 2.09% by weight; and organic matter having 86.5% by weight.

The composition 200 contains the plant extracts ingredients having anti-insect properties (A) is obtained by mixing homogenizing a tobacco waste extracts solution with at least one ingredients is a plant mixture extracts solution; wherein the plant extracts ingredients having anti-insect properties (A) containing at least 0.009% % by weight of a nicotine compound.

According to the embodiment of the present invention, the plant extracts ingredients having anti-insect properties (A) further comprising an neem leaf extracts; wherein the neem leaf extracts extracted from fresh neem leaves (*Azadirachta indica*) crushed/chopped/or not chopped, immersed are soaked in solvent, or saturated brine solution.

According to the embodiment of the present invention, the plant extracts ingredients having anti-insect properties (A) further comprising a chinaberry leaf extracts; wherein the chinaberry leaf extracts extracted from fresh neem leaves (*Melia azedarach*) crushed/chopped/or not chopped, immersed are soaked in solvent, or saturated brine solution.

According to the preferred embodiment of the present invention, the tobacco waste extracts solution extracted from fresh, or dried, crushed/chopped/cut tobacco waste, soaked in ethanol 98% at 30° C.-45° C. for 7 days, with the combination of stirring once/day for 10 minutes, then filtered and separated an extracted waste tobacco residues; wherein a ratio of soaking the tobacco waste and ethanol 98% having 3:10; wherein the tobacco waste including leaf veins, stems, roots, and leaves have been removed.

According to the preferred embodiment of the present invention, the plant mixture extracts solution created by performed in a specific order from (a) to (f) comprising:
(a) preparing plant mixture consisting of green tomatoes, sprouted potatoes, eggplants, chilli/peppers/bell pepper, and pond apple seeds (*Annona glabra* seeds); all are chopped and mixed in the respective ratio of 1:1:1:1:1;
(b) soaking said chopped plant mixture with ethanol 70% in a ratio of 1:5 at room temperature, with the combination of stirring at 100 rpm for 3 days;
(c) filtering said soaked plant mixture to obtained a first solution, and a first residue;
(d) soaking the first residue at step (c) with ethanol 70% in a ratio of 1:5 at room temperature, with the combination of stirring at 100 rpm for 3 days;
(e) filtering said soaked first residue to obtained a second solution, and an extracted plant mixture residue; wherein the filter hole diameter at step (e) is 25% smaller than the filter hole diameter at step (c); and
(f) mixing homogenizing the first solution at step (c) with the second solution at step (e) to obtain the plant mixture extracts solution.

According to the embodiment of the present invention, the composition 200 contains the water-retaining ingredient (B) created by performed in a specific order from (a') to (b') comprising:

(a') preparing a pectin extracts by steps comprising:
creating a raw pectin extracts mixture by mixing 1 part a pectin extract from coffee husks and cocoa shells, with 2 parts a pectin extract from yam (*Dioscorea alata* L.), and 3 parts a pectin extract from okra (*Abelmoschus esculentus* (L.) Moench);
precipitation with isopropanol in the ratio of 1 part the raw pectin with 2 parts isopropanol at the temperature of 90° C.-95° C. for 90-100 minutes; then centrifuging at 400-500 rpm for 20-30 minutes; to create a precipitate solution;
filtering and washing the precipitate solution with ethanol 70% until the precipitate solution having white; then drying at 50° C.-60° C. for 20-24 hours to create the pectin extracts having moisture content of 7%-9%; and (b') creating the water-retaining ingredient by steps comprising:
gelatinizing the pectin extracts for 5-7 minutes at 70° C.-75° C.;
adding acetyl peroxide with the combination of stirring at 85° C. for 40 minutes; wherein Acetyl peroxide having concentration of 0.1%-0.3%;
adding acrylic acid with the combination of stirring at 40° C. for 20 minutes;
adding 1,4-butanediol diacrylate with the combination of stirring at 55° C.-60° C. for 5 minutes, then drying at 65° C. to constant weight to obtain the water-retaining ingredient.

According to the preferred embodiment of the present invention, the pectin extract from coffee husks and cocoa shells created by performed in a specific order from (a") to (d") comprising:
(a") collecting coffee husks and cocoa shells in a ratio of 2:1; then washing, cutting, drying, and grinding to create a powder mixture having moisture content of 10%-13%;
(b") hydrolyzing 1 part the powder mixture with 20 parts $H_2SO_4$ acid including two stages:
stage 1: soaking 1 part the powder mixture with 15 parts $H_2SO_4$ acid at 80° C. for 1.5 hours, with the combination of stirring, and maintain pH of 1.5;
stage 2: adding 5 parts of $H_2SO_4$ acid for continue soaking at 50° C. for 1 hour, maintain pH of 1.5, with the combination of stirring, then filtering to create a first filtrate and a residue;
(c") hydrolyzing 1 part the residue at step (b") with 10 parts acetic acid including two stages:
stage 1: soaking 1 part the residue with 7 parts acetic acid at 80° C. for 45 minutes, with the combination of stirring, and maintain pH of 2;
stage 2: adding 3 parts of acetic acid for continue soaking at 40° C. for 30 minutes, with the combination of stirring, and maintain pH of 2; then filtering to obtain a second filtrate, and a coffee husks and cocoa shells mixture residue with the pectin removed; and
(d") centrifuging a mixture of the first filtrate at step (b") and the second filtrate at step (c") with 3000-3500 rpm for 15 minutes to create the pectin extract from coffee husks and cocoa shells.

According to the preferred embodiment of the present invention, the pectin extract from yam (*Dioscorea alata* L.) created by performed in a specific order from (i') to (v') comprising:

(i') selecting yams (*Dioscorea alata* L.) that are not crushed or rotten; then washing them with water to remove impurities;
(ii') peeling off the outer skin, crushing, stirring for 5-10 minutes, then filtering by filter cloth to create a first yams residue;
(iii') drying the first yams residue at 70° C.-80° C. for 20-24 hours to create a yams of powder having moisture content of 10%-13%;
(iv') hydrolyzing 1 part of the yams of powder with 20 parts of $H_2SO_4$ acid solution including two stages:
stage 1: soaking 1 part of the the yams of powder with 15 parts of $H_2SO_4$ acid at 80° C. for 1.5 hours, with the combination of stirring, and maintain pH at 1.5;
stage 2: adding 5 parts of $H_2SO_4$ acid for continue soaking at 50° C. for 1 hour, with the combination of stirring, and maintain pH at 2, then filtering to create a first yams filtrate, and a second yams residue;
(v') hydrolyzing 1 part of the second yams residue with 10 parts acetic acid including two stages:
stage 1: soaking 1 part the second yams residue with 7 parts of acetic acid at 80° C. for 45 minutes, with the combination of stirring, and maintain pH at 2;
stage 2: adding 3 parts of acetic acid for continue soaking at 40° C. for 30 minutes, with the combination of stirring, and maintain pH at 2, then filtering to create a second yams filtrate, and a pectin-reduced yams residue;
(vi') centrifuging a mixture of the first yams filtrate at step (iv') and the second yams filtrate at step (v') with 3000-3500 rpm for 15 minutes to create the pectin extract from yam.

According to the preferred embodiment of the present invention, the pectin extract from okra (*Abelmoschus esculentus* (L.) Moench) created by performed in a specific order from (i") to (v") comprising:
(i") cutting okra (*Abelmoschus esculentus* (L.) Moench) into thin slices 1-5 mm thick, then admixing with water in the ratio 1:1 to create a okra mixture;
(ii") adjusting the pH of the okra mixture to 5.5, then adding 0.1% pectinase enzyme, and incubating at 45° C. for 30 minutes;
(iii") filtering said the incubated okra mixture to obtain a okra residue, and a first temporary filtrate;
(iv") hydrolyzing 1 part of first temporary filtrate with 8 parts of $HNO_3$ acid including two stages:
stage 1: soaking 1 part of the okra residue with 5 parts of $HNO_3$ acid at 60° C. for 45 minutes, with the combination of stirring, and maintain pH at 1.5;
stage 2: adding 3 parts of HNO3 acid for continue soaking at 30° C. for 30 minutes, with the combination of stirring, and maintain pH at 2, then filtering to obtain a second temporary filtrate, and a pectin-reduced okra residue; and
(v") centrifuging a mixture of the first temporary filtrate at step (iii") and the second temporary filtrate at step (iv") with 3000-3500 rpm for 15 minutes to create the pectin extract from okra.

According to the embodiment of the present invention, the composition 200 contains the chelation of trace elements solution (C) by steps comprising:
creating a extract from katuk/star gooseberry/sweet leaves (*Sauropus androgynous*) and kale leaves by extracted from katuk/star gooseberry/sweet leaves (*Sauropus androgynous*) and kale leaves fresh are crushed/chopped/cut, then soaking in a in solvent, or saturated brine solution for 2 hours; wherein a ratio of mixing the katuk/star gooseberry/sweet leaves (*Sauropus androgynous*) with kale leaves is 1:3;

creating a trace solution by mixing the extract from katuk/star gooseberry/sweet leaves (*Sauropus androgynous*) and kale leaves with a micronutrient extracts from rare earth in the ratio 1:1; wherein the micronutrient extracts from rare earth having pH of 6.2, and obtained by combining treatment with dilute HNO3 55% and aqua regia solution;

grinding peat to obtain a peat powder; wherein said peat has been treated bituminous, and having moisture content of 30%-35%;

treating the peat powder with NaOH 10% in the ratio 1:3 for 60 minutes; then filtering to obtain a first temporary solution, and a first temporary residue;

treating the first temporary residue with NaOH 50% in the ratio 1:2 for 30 minutes; then filtering to obtain a second temporary solution, and a second temporary residue;

treating the second temporary residue with acid solution having 50% concentration in a ratio of 1:1.5 for 30 minutes; then filtering to obtain a third solution, and a treated peat residue; wherein acid solution used is selected from one of the following acids: acetic acid, HCl acid, and $HNO_3$ acid;

admixing the first solution with the second solution, and the third solution to create a base solution; and admixing the trace solution and the base solution in the ratio 1:(1-3), with the combination of stirring to create the chelation of trace elements solution.

It should be noted that the terms "admixed/mixed/admixing/mixing" as used in the present invention is understood to mean adding, or reacting, or dissolving homogeneously, or evenly, components in the same solution/mixture.

A multipurpose fertilizer composition having anti-insect properties, water-retaining, a and capable of improving to absorb micronutrients for plants 300 ("composition 300") according to method 100 obtained from the process of forming a homogeneous mixture by mixing a fertilizer mixture (D) with at least three other ingredients including a plant extracts ingredients having anti-insect properties (A), a water-retaining ingredient (B), and a chelation of trace elements solution (C) having the correct a predetermined ratio; wherein the fertilizer mixture (D) is obtained by mixing at least two ingredients from three ingredients comprising a base fertilizer (D1), a NPK fertilizer (D2), and a foundation fertilizer (D3); in which the foundation fertilizer (D3) in solid form obtained from the process of forming a second after incubated mixture, and shaping the second after incubated mixture after adjusting the pH at 6.2-7, and moisture content of less than 13%.

According to the embodiment of the present invention, the plant extracts ingredients having anti-insect properties (A) having 5%-7% of the weight of the fertilizer mixture (D).

According to the embodiment of the present invention, the water-retaining ingredient (B) having 7%-10% of the total weight of the fertilizer mixture (D) and the plant extracts ingredients having anti-insect properties (A).

According to the embodiment of the present invention, the chelation of trace elements solution (C) having 0.08%-3% of the total weight of the fertilizer mixture (D) with the plant extracts ingredients having anti-insect properties (A), and the water-retaining ingredient (B).

According to the embodiment of the present invention, the fertilizer mixture (D) is obtained depend on the ratio of the weight of each ingredient D1-D3, including a first formula, a second formula, a third formula, and a fourth formula; wherein the fourth formula is better than the third formula, the third formula is better than the second formula, and the second formula is better than the first formula. The comparative factor is anti-insect properties, water-retaining, and capable of improving to absorb micronutrients for plants surveyed when each formula mixing homogenizing with plant extracts ingredients having anti-insect properties (A), a water-retaining ingredient (B), and a chelation of trace elements solution (C) to create the homogeneous mixture.

According to the embodiment of the present invention, the first formula comprising 1 part the base fertilizer (D1), 2 parts the NPK fertilizer (D2), and 0 part the foundation fertilizer (D3).

According to the embodiment of the present invention, the second formula comprising 0 part the base fertilizer (D1), 2 parts the NPK fertilizer (D2), and 1 part the foundation fertilizer (D3).

According to the embodiment of the present invention, the third formula comprising 2 parts the base fertilizer (D1), 0 part the NPK fertilizer (D2), and 1 part the foundation fertilizer (D3).

According to the embodiment of the present invention, the fourth formula comprising 1 part the base fertilizer (D1), 1 part the NPK fertilizer (D2), and 1 part the foundation fertilizer (D3).

According to the embodiment of the present invention, the base fertilizer (D1) comprising chemical components: organic matter having 70.4% by weight, an elemental nitrogen (N) having at least 0.25% by weight, an elemental phosphorus (P) having at least 0.69% by weight, and an elemental potassium (K) having at least 5.4% by weight, an elemental sulfur (S) having at least 0.000005% by weight, an elemental bo (B) having at least 0.003% by weight, an elemental calcium (Ca) having at least 0.025% by weight, and an elemental magnesium (Mg) having at least 0.0113% by weight.

According to the embodiment of the present invention, the second after incubated mixture created by performed in a specific order from (i) to (iii) comprising:

(i) creating a base mixture by mixing a manure, a poultry manure, and the tobacco waste in a ratio of 2:1:4; then crushing to size less than 0.05 mm;

wherein the manure, and the poultry manure having moisture content of 42%-45%;

the manure is selected from one or a combination of cow manure, pig manure, horse manure, goat manure, and sheep manure; wherein cow manure having at least 28% of the weight of the manure;

the poultry manure is selected from one or a combination of chicken manure, duck manure, geese manure, pigeon manure, and quail droppings; wherein chicken manure having at least 28% of the weight of the poultry manure;

wherein the tobacco waste including leaf veins, stems, roots, and leaves have been removed;

(ii) admixing a microorganism ingredient into a extracted residue mixture, then incubating at 45° C.-60° C. for 5 hours to create a first after incubated mixture; wherein microorganism ingredient having 0.05% of the weight of the extracted residue mixture;

wherein the extracted residue mixture comprising: the extracted waste tobacco residues, the extracted plant mixture residue, the treated peat residue, the coffee husks and cocoa shells mixture residue, the pectin-reduced yams residue, and the pectin-reduced okra residue; and (iii) admixing the base mixture, the first after incubated mixture, and the microorganism ingredient in the ratio of 90:10:1, then incubating at 45° C.-60° C. for 25-28 days with humidity of 60%-65%, with the combination of mixing frequency every one day for 20 minutes; that to create a second after incubated mixture. The second after incubated mixture having a chemical components comprising: an elemental nitrogen (N) having 1.77% by weight; an elemental phosphorus (P) having 0.69% by weight; an elemental potassium (K) having 5.4% by weight; an elemental sulfur (S) having 0.39% by weight; an elemental bo (B) having 0.0409% by weight; an elemental calcium (Ca) having 2.82% by weight; an elemental magnesium (Mg) having 0.49% by weight; an elemental copper (Cu) having 0.0024% by weight; an elemental zinc (Zn) having 0.0047% by weight; an elemental manganese (Mn) having 0.0149% by weight; an elemental iron (Fe) having 0.119% by weight; nitrogen-fixing microorganisms having $1.1\times 10^6$ CFU/g; phosphate solubilizing microorganisms (PSMs) having $2.1\times 10^5$ CFU/g; cellulose-degrading microorganisms having $7.1\times 10^5$ CFU/g; humic acid having 2.09% by weight; and organic matter having 86.5% by weight.

300 having specifications/method same the plant extracts ingredients having anti-insect properties (A), the water-retaining ingredient (B), and the chelation of trace elements solution (C) of the composition 200 that described in detail above.

The composition 200, and the composition 300 according to the present invention is used simply, for arid areas without irrigation, it is necessary to fertilize at the end of the dry season or at the beginning of the rainy season, increase the water holding capacity of the soil, and maintain soil moisture in the local conditions. Without irrigation water for a long time, it contributes to improving the survival rate of plants. The application of fertilizer is similar to giving plant medicine, that is, it must be reapplied after a certain time. In an exemplary embodiment of the present invention, composition 200, and the composition 300 obtained from method 100 are used to basal fertilize or top-dressing all crops.

The example is made according to the embodiment of the present invention. The composition 200 is created by method 100 with a capacity of 1000 L/batch including eight examples listed in Table 1 below.

TABLE 1

Mixed ingredients of the composition 200 in eight examples according to the embodiment of the present invention

| Name of | Unit (L) | | | | | | | |
| --- | --- | --- | --- | --- | --- | --- | --- | --- |
| | Example 1 | Example 2 | Example 3 | Example 4 | Example 5 | Example 6 | Example 7 | Example 8 |
| The plant extracts ingredients having anti-insect properties | 0.8 | 1 | 5 | 10 | 15 | 20 | 25 | 30 |
| The water-retaining ingredient | 90 | 90 | 80 | 85 | 70 | 75 | 80 | 75 |
| The chelation of trace elements solution | 55 | 50 | 55 | 50 | 45 | 55 | 50 | 55 |
| The fertilizer mixture | rest | rest | rest | rest | rest | rest | rest | rest |

According to the preferred embodiment of the present invention, the plant extracts ingredients having anti-insect properties (A), the water-retaining ingredient (B), and the chelation of trace elements solution (C) of the composition According to another embodiment taken as an example of the invention, the composition 300 is created by method 100 with a capacity of 1000 Kg/batch including eight examples listed in Table 2 below.

TABLE 2

Mixed ingredients of the composition 300 in eight examples according to the embodiment of the present invention

| Name of | Unit (Kg) | | | | | | | |
| --- | --- | --- | --- | --- | --- | --- | --- | --- |
| | Example 1 | Example 2 | Example 3 | Example 4 | Example 5 | Example 6 | Example 7 | Example 8 |
| The plant extracts ingredients having anti-insect properties | 2 | 4 | 8 | 12 | 14 | 18 | 22 | 26 |
| The water-retaining ingredient | 80 | 75 | 90 | 80 | 85 | 70 | 95 | 95 |
| The chelation of trace elements solution | 62 | 60 | 50 | 60 | 48 | 60 | 60 | 55 |
| The fertilizer mixture | rest | rest | rest | rest | rest | rest | rest | rest |

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, element components, and/or groups thereof.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order, or steps may be added, deleted, or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A multipurpose fertilizer composition having anti-insect properties, water-retaining, and capable of improving to absorb micronutrients for plants obtained from the process of forming a homogeneous mixture by mixing a fertilizer mixture with at least three other ingredients including a chelation of trace elements solution, a water-retaining ingredient, and a plant extracts ingredients having anti-insect properties;

(A) wherein the plant extracts ingredients having anti-insect properties is obtained by mixing homogenizing a tobacco waste extracts solution with at least one ingredients is a plant mixture extracts solution; wherein the plant extracts ingredients having anti-insect properties (A) containing at least 0.009% % by weight of a nicotine compound;

the tobacco waste extracts solution extracted from fresh, or dried, crushed/chopped/cut tobacco waste, soaked in ethanol 98% at 30° C.-45° C. for 7 days, with the combination of stirring once/day for 10 minutes, then filtered and separated an extracted waste tobacco residues; wherein a ratio of soaking the tobacco waste and ethanol 98% having 3:10; wherein the tobacco waste including leaf veins, stems, roots, and leaves have been removed;

the plant mixture extracts solution created by performed in a specific order from (a) to (f) comprising:

(a) preparing plant mixture consisting of green tomatoes, sprouted potatoes, eggplants, chilli/peppers/bell pepper, and pond apple seeds (Annona glabra seeds); all are chopped and mixed in the respective ratio of 1:1:1:1:1;

(b) soaking said chopped plant mixture with ethanol 70% in a ratio of 1:5 at room temperature, with the combination of stirring at 100 rpm for 3 days;

(c) filtering said soaked plant mixture to obtained a first solution, and a first residue;

(d) soaking the first residue with ethanol 70% in a ratio of 1:5 at room temperature, with the combination of stirring at 100 rpm for 3 days;

(e) filtering said soaked first residue to obtained a second solution, and an extracted plant mixture residue; wherein the filter hole diameter at step (e) is 25% smaller than the filter hole diameter at step (c); and (f) mixing homogenizing the first solution with the second solution to obtained the plant mixture extracts solution;

(B) wherein the water-retaining ingredient created by performed in a specific order from (a') to (b') comprising:

(a') preparing a pectin extracts by steps comprising:

creating a raw pectin extracts mixture by mixing 1 part a pectin extract from coffee husks and cocoa shells, with 2 parts a pectin extract from yam (*Dioscorea alata* L.), and 3 parts a pectin extract from okra (*Abelmoschus esculentus* (L.) Moench);

precipitation with isopropanol in the ratio of 1 part the raw pectin with 2 parts isopropanol at the temperature of 90° C.-95° C. for 90-100 minutes; then centrifuging at 400-500 rpm for 20-30 minutes; to create a precipitate solution;

filtering and washing the precipitate solution with ethanol 70% until the precipitate solution having white; then drying at 50° C.-60° C. for 20-24 hours to create the pectin extracts having moisture content of 7%-9%; and (b') creating the water-retaining ingredient by steps comprising:

gelatinizing the pectin extracts for 5-7 minutes at 70° C.-75° C.;

adding acetyl peroxide with the combination of stirring at 85° C. for 40 minutes; wherein Acetyl peroxide having concentration of 0.1%-0.3%;

adding acrylic acid with the combination of stirring at 40° C. for 20 minutes;

adding 1,4-butanediol diacrylate with the combination of stirring at 55° C.-60° C. for 5 minutes, then drying at 65° C. to constant weight to obtain the water-retaining ingredient;

(C) wherein the chelation of trace elements solution by steps comprising:

creating a extract from katuk/star gooseberry/sweet leaves (*Sauropus androgynous*) and kale leaves by extracted from katuk/star gooseberry/sweet leaves (*Sauropus androgynous*) and kale leaves fresh are crushed/chopped/cut, then soaking in a in solvent, or saturated brine solution for 2 hours; wherein a ratio of mixing the katuk/star gooseberry/sweet leaves (*Sauropus androgynous*) with kale leaves is 1:3;

creating a trace solution by mixing the extract from katuk/star gooseberry/sweet leaves (*Sauropus androgynous*) and kale leaves with a micronutrient extracts from rare earth in the ratio 1:1; wherein the micronutrient extracts from rare earth having pH of 6.2, and obtained by combining treatment with dilute HNO3 55% and aqua regia solution;

grinding peat to obtain a peat powder; wherein said peat has been treated bituminous, and having moisture content of 30%-35%;

treating the peat powder with NaOH 10% in the ratio 1:3 for 60 minutes; then filtering to obtain a first temporary solution, and a first temporary residue;

treating the first temporary residue with NaOH 50% in the ratio 1:2 for 30 minutes; then filtering to obtain a second temporary solution, and a second temporary residue;

treating the second temporary residue with acid solution having 50% concentration in a ratio of 1:1.5 for 30 minutes; then filtering to obtain a third solution, and a treated peat residue; wherein acid solution used is selected from one of the following acids: acetic acid, HCl acid, and $HNO_3$ acid;

admixing the first solution with the second solution, and the third solution to create a base solution; and admixing the trace solution and the base solution in the ratio 1:(1-3), with the combination of stirring to create the chelation of trace elements solution;

(D) wherein the fertilizer mixture is obtained by mixing at least two ingredients from three ingredients comprising a base fertilizer, a NPK fertilizer, and a foundation fertilizer;

the base fertilizer comprising chemical components: organic matter having by weight, an elemental nitrogen (N) having at least 0.25% by weight, an elemental phosphorus (P) having at least 0.69% by weight, and an elemental potassium (K) having at least 5.4% by weight, an elemental sulfur (S) having at least 0.000005% by weight, an elemental bo (B) having at least 0.003% by weight, an elemental calcium (Ca) having at least 0.025% by weight, and an elemental magnesium (Mg) having at least 0.0113% by weight;

the foundation fertilizer (D3) in liquid form obtained from the process of forming a second after incubated mixture, then centrifuged three times the second after incubated mixture to create a after centrifuged solution, then adjusting the pH of the after centrifuged solution having 6.2-7 to create the foundation fertilizer in liquid form; wherein before each centrifugation, adding water to soaking for 20 minutes, with the combination of stirring for 5 minutes;

the second after incubated mixture created by performed in a specific order from (i) to (iii) comprising:

(i) creating a base mixture by mixing a manure, a poultry manure, and the tobacco waste in a ratio of 2:1:4; then crushing to size less than 0.05 mm;

wherein the manure, and the poultry manure having moisture content of 42%-45%;

the manure is selected from the group consisting of cow manure, pig manure, horse manure, goat manure, sheep manure, and combinations thereof; wherein cow manure having at least 28% of the weight of the manure;

the poultry manure is selected from the group consisting of chicken manure, duck manure, geese manure, pigeon manure, quail droppings, and combinations thereof; wherein chicken manure having at least 28% of the weight of the poultry manure;

wherein the tobacco waste including leaf veins, stems, roots, and leaves have been removed;

(ii) admixing a microorganism ingredient into a extracted residue mixture, then incubating at 45° C.-60° C. for 5 hours to create a first after incubated mixture; wherein microorganism ingredient having 0.05% of the weight of the extracted residue mixture;

wherein the extracted residue mixture comprising: the extracted waste tobacco residues, the extracted plant mixture residue, the treated peat residue, a coffee husks and cocoa shells mixture residue, a pectin-reduced yams residue, and a pectin-reduced okra residue;

(iii) admixing the base mixture, the first after incubated mixture, and the microorganism ingredient in the ratio of 90:10:1, then incubating at 45° C.-60° C. for 25-28 days with humidity of 60%-65%, with the combination of mixing frequency every one day for 20 minutes; that to create a second after incubated mixture having a chemical components comprising: an elemental nitrogen (N) having 1.77% by weight; an elemental phosphorus (P) having 0.69% by weight; an elemental potassium (K) having 5.4% by weight; an elemental sulfur (S) having 0.39% by weight; an elemental bo (B) having 0.0409% by weight; an elemental calcium (Ca) having 2.82% by weight; an elemental magnesium (Mg) having 0.49% by weight; an elemental copper (Cu) having 0.0024% by weight; an elemental zinc (Zn) having 0.0047% by weight; an elemental manganese (Mn) having 0.0149% by weight; an elemental iron (Fe) having 0.119% by weight; nitrogen-fixing microorganisms having $1.1 \times 10^6$ CFU/g; phosphate solubilizing microorganisms (PSMs) having $2.1 \times 10^5$ CFU/g; cellulose-degrading microorganisms having $7.1 \times 10^5$ CFU/g; humic acid having 2.09% by weight; and organic matter having 86.5% by weight;

wherein the chelation of trace elements solution having 5%-7% of the weight of the fertilizer mixture;

wherein the water-retaining ingredient having 7%-10% of the total weight of the fertilizer mixture, and the chelation of trace elements solution;

wherein the plant extracts ingredients having anti-insect properties having 0.08%-3% of the total weight of the fertilizer mixture, with the chelation of trace elements solution, and the water-retaining ingredient.

2. The multipurpose fertilizer composition of claim 1, wherein the pectin extract from coffee husks and cocoa shells created by performed in a specific order from (a") to (d") comprising:

(a") collecting coffee husks and cocoa shells in a ratio of 2:1; then washing, cutting, drying, and grinding to create a powder mixture having moisture content of 10%-13%;

(b") hydrolyzing 1 part the powder mixture with 20 parts $H_2SO_4$ acid including two stages:
  stage 1: soaking 1 part the powder mixture with 15 parts $H_2SO_4$ acid at 80° C. for 1.5 hours, with the combination of stirring, and maintain pH of 1.5;
  stage 2: adding 5 parts of $H_2SO_4$ acid for continue soaking at 50° C. for 1 hour, maintain pH of 1.5, with the combination of stirring, then filtering to create a first filtrate and a residue;

(c") hydrolyzing 1 part the residue at step (b") with 10 parts acetic acid including two stages:
  stage 1: soaking 1 part the residue with 7 parts acetic acid at 80° C. for 45 minutes, with the combination of stirring, and maintain pH of 2;
  stage 2: adding 3 parts of acetic acid for continue soaking at 40° C. for 30 minutes, with the combination of stirring, and maintain pH of 2; then filtering to obtain a second filtrate, and the coffee husks and cocoa shells mixture residue with the pectin removed; and (d") centrifuging a mixture of the first filtrate at step (b") and the second filtrate at step (c") with 3000-3500 rpm for 15 minutes to create the pectin extract from coffee husks and cocoa shells.

3. The multipurpose fertilizer composition of claim 1, wherein the pectin extract from yam (*Dioscorea alata*L.) created by performed in a specific order from (i') to (v') comprising:

(i') selecting yams (*Dioscorea alata* L.) that are not crushed or rotten; then washing them with water to remove impurities;

(ii') peeling off the outer skin, crushing, stirring for 5-10 minutes, then filtering by filter cloth to create a first yams residue;

(iii') drying the first yams residue at 70° C.-80° C. for 20-24 hours to create a yams of powder having moisture content of 10%-13%;

(iv') hydrolyzing 1 part of the yams of powder with 20 parts of $H_2SO_4$ acid solution including two stages:
  stage 1: soaking 1 part of the the yams of powder with 15 parts of $H_2SO_4$ acid at 80° C. for 1.5 hours, with the combination of stirring, and maintain pH at 1.5;
  stage 2: adding 5 parts of $H_2SO_4$ acid for continue soaking at 50° C. for 1 hour, with the combination of stirring, and maintain pH at 2, then filtering to create a first yams filtrate, and a second yams residue;

(v') hydrolyzing 1 part of the second yams residue with 10 parts acetic acid including two stages:
  stage 1: soaking 1 part the second yams residue with 7 parts of acetic acid at 80° C. for 45 minutes, with the combination of stirring, and maintain pH at 2;
  stage 2: adding 3 parts of acetic acid for continue soaking at 40° C. for 30 minutes, with the combination of stirring, and maintain pH at 2, then filtering to create a second yams filtrate, and the pectin-reduced yams residue;

(vi') centrifuging a mixture of the first yams filtrate at step (iv') and the second yams filtrate at step (v') with 3000-3500 rpm for 15 minutes to create the pectin extract from yam.

4. The multipurpose fertilizer composition of claim 1, wherein the pectin extract from okra (*Abelmoschus esculentus* (L.) Moench) created by performed in a specific order from (i") to (v") comprising:

(i") cutting okra (*Abelmoschus esculentus* (L.) Moench) into thin slices 1-5 mm thick, then admixing with water in the ratio 1:1 to create a okra mixture;

(ii") adjusting the pH of the okra mixture to 5.5, then adding 0.1% pectinase enzyme, and incubating at 45° C. for 30 minutes;

(iii") filtering said the incubated okra mixture to obtain a okra residue, and a first temporary filtrate;

(iv") hydrolyzing 1 part of first temporary filtrate with 8 parts of $HNO_3$ acid including two stages:
  stage 1: soaking 1 part of the okra residue with 5 parts of $HNO_3$ acid at 60° C. for minutes, with the combination of stirring, and maintain pH at 1.5;
  stage 2: adding 3 parts of $HNO_3$ acid for continue soaking at 30° C. for 30 minutes, with the combination of stirring, and maintain pH at 2, then filtering to obtain a second temporary filtrate, and the pectin-reduced okra residue; and (v") centrifuging a mixture of the first temporary filtrate at step (iii") and the second temporary filtrate at step (iv") with 3000-3500 rpm for 15 minutes to create the pectin extract from okra.

5. The multipurpose fertilizer composition of claim 1, wherein the fertilizer mixture comprising one part the base fertilizer, two parts the NPK fertilizer, and 0 part the foundation fertilizer.

6. The multipurpose fertilizer composition of claim 1, wherein the fertilizer mixture comprising 0 part the base fertilizer, two parts the NPK fertilizer, and one part the foundation fertilizer.

7. The multipurpose fertilizer composition of claim 1, wherein the fertilizer mixture comprising two parts the base fertilizer, 0 part the NPK fertilizer, and one part the foundation fertilizer.

8. The multipurpose fertilizer composition of claim 1, wherein the fertilizer mixture comprising one part the base fertilizer, one part the NPK fertilizer, and one part the foundation fertilizer.

9. The multipurpose fertilizer composition of claim 1, wherein the plant extracts ingredients having anti-insect properties further comprising an neem leaf extracts; wherein the neem leaf extracts extracted from fresh neem leaves (*Azadirachta indica*) crushed/chopped/or not chopped, immersed are soaked in solvent, or saturated brine solution.

10. The multipurpose fertilizer composition of claim 1, wherein the plant extracts ingredients having anti-insect properties further comprising a chinaberry leaf extracts; wherein the chinaberry leaf extracts extracted from fresh neem leaves (*Melia azedarach*) crushed/chopped/or not chopped, immersed are soaked in solvent, or saturated brine solution.

11. A multipurpose fertilizer composition having anti-insect properties, water-retaining, and capable of improving to absorb micronutrients for plants obtained from the process of forming a homogeneous mixture by mixing a fertilizer mixture with at least three other ingredients including a chelation of trace elements solution, a water-retaining ingredient, and a plant extracts ingredients having anti-insect properties;

(A) wherein the plant extracts ingredients having anti-insect properties is obtained by mixing homogenizing a tobacco waste extracts solution with at least one ingredients is a plant mixture extracts solution; wherein the plant extracts ingredients having anti-insect properties (A) containing at least 0.009% % by weight of a nicotine compound;

the tobacco waste extracts solution extracted from fresh, or dried, crushed/chopped/cut tobacco waste, soaked in ethanol 98% at 30° C.-45° C. for 7 days, with the combination of stirring once/day for 10 minutes, then filtered and separated an extracted waste tobacco residues; wherein a ratio of soaking the tobacco waste and ethanol 98% having 3:10; wherein the tobacco waste including leaf veins, stems, roots, and leaves have been removed;

the plant mixture extracts solution created by performed in a specific order from (a) to (f) comprising:
(a) preparing plant mixture consisting of green tomatoes, sprouted potatoes, eggplants, chilli/peppers/bell pepper, and pond apple seeds (*Annona glabra* seeds); all are chopped and mixed in the respective ratio of 1:1:1:1:1;
(b) soaking said chopped plant mixture with ethanol 70% in a ratio of 1:5 at room temperature, with the combination of stirring at 100 rpm for 3 days;
(c) filtering said soaked plant mixture to obtained a first solution, and a first residue;
(d) soaking the first residue with ethanol 70% in a ratio of 1:5 at room temperature, with the combination of stirring at 100 rpm for 3 days;
(e) filtering said soaked first residue to obtained a second solution, and an extracted plant mixture residue; wherein the filter hole diameter at step (e) is 25% smaller than the filter hole diameter at step (c); and
(f) mixing homogenizing the first solution with the second solution to obtained the plant mixture extracts solution;

(B) wherein the water-retaining ingredient created by performed in a specific order from (a') to (b') comprising:
(a') preparing a pectin extracts by steps comprising:
creating a raw pectin extracts mixture by mixing 1 part a pectin extract from coffee husks and cocoa shells, with 2 parts a pectin extract from yam (*Dioscorea alata* L.), and 3 parts a pectin extract from okra (*Abelmoschus esculentus* (L.) Moench);
precipitation with isopropanol in the ratio of 1 part the raw pectin with 2 parts isopropanol at the temperature of 90° C.-95° C. for 90-100 minutes; then centrifuging at 400-500 rpm for 20-30 minutes; to create a precipitate solution;
filtering and washing the precipitate solution with ethanol 70% until the precipitate solution having white; then dyring at 50° C.-60° C. for 20-24 hours to create the pectin extracts having moisture content of 7%-9%; and
(b') creating the water-retaining ingredient by steps comprising:
gelatinizing the pectin extracts for 5-7 minutes at 70° C.-75° C.;
adding acetyl peroxide with the combination of stirring at 85° C. for 40 minutes; wherein Acetyl peroxide having concentration of 0.1%-0.3%;
adding acrylic acid with the combination of stirring at 40° C. for 20 minutes;
adding 1,4-butanediol diacrylate with the combination of stirring at 55° C.-60° C. for 5 minutes, then drying at 65° C. to constant weight to obtain the water-retaining ingredient;

(C) wherein the chelation of trace elements solution by steps comprising:
creating a extract from katuk/star gooseberry/sweet leaves (Sauropus androgynous) and kale leaves by extracted from katuk/star gooseberry/sweet leaves (Sauropus androgynous) and kale leaves fresh are crushed/chopped/cut, then soaking in a in solvent, or saturated brine solution for 2 hours; wherein a ratio of mixing the katuk/star gooseberry/sweet leaves (Sauropus androgynous) with kale leaves is 1:3;
creating a trace solution by mixing the extract from katuk/star gooseberry/sweet leaves (Sauropus androgynous) and kale leaves with a micronutrient extracts from rare earth in the ratio 1:1; wherein the micronutrient extracts from rare earth having pH of 6.2, and obtained by combining treatment with dilute HNO3 55% and aqua regia solution;
grinding peat to obtain a peat powder; wherein said peat has been treated bituminous, and having moisture content of 30%-35%;
treating the peat powder with NaOH 10% in the ratio 1:3 for 60 minutes; then filtering to obtain a first temporary solution, and a first temporary residue;
treating the first temporary residue with NaOH 50% in the ratio 1:2 for 30 minutes; then filtering to obtain a second temporary solution, and a second temporary residue;
treating the second temporary residue with acid solution having 50% concentration in a ratio of 1:1.5 for 30 minutes; then filtering to obtain a third solution, and a treated peat residue; wherein acid solution used is selected from one of the following acids: acetic acid, HCl acid, and $HNO_3$ acid;
admixing the first solution with the second solution, and the third solution to create a base solution; and
admixing the trace solution and the base solution in the ratio 1:(1-3), with the combination of stirring to create the chelation of trace elements solution;

(D) wherein the fertilizer mixture is obtained by mixing at least two ingredients from three ingredients comprising a base fertilizer, a NPK fertilizer, and a foundation fertilizer;
the base fertilizer comprising chemical components: organic matter having 70.4% by weight, an elemental nitrogen (N) having at least 0.25% by weight, an elemental phosphorus (P) having at least 0.69% by weight, and an elemental potassium (K) having at least 5.4% by weight, an elemental sulfur (S) having at least 0.000005% by weight, an elemental bo (B) having at least 0.003% by weight, an elemental calcium (Ca) having at least 0.025% by weight, and an elemental magnesium (Mg) having at least 0.0113% by weight;
the foundation fertilizer (D3) in solid form obtained from the process of forming a second after incubated mixture, and shaping the second after incubated mixture after adjusting the pH at 6.2-7, and moisture content of less than 13%;
the second after incubated mixture created by performed in a specific order from (i) to (iii) comprising:
(i) creating a base mixture by mixing a manure, a poultry manure, and the tobacco waste in a ratio of 2:1:4; then crushing to size less than 0.05 mm; wherein the manure, and the poultry manure having moisture content of 42%-45%;

the manure is selected from the group consisting of cow manure, pig manure, horse manure, goat manure, sheep manure, and combinations thereof; wherein cow manure having at least 28% of the weight of the manure;

the poultry manure is selected from the group consisting of chicken manure, duck manure, geese manure, pigeon manure, quail droppings, and combinations thereof; wherein chicken manure having at least 28% of the weight of the poultry manure;

wherein the tobacco waste including leaf veins, stems, roots, and leaves have been removed;

(ii) admixing a microorganism ingredient into a extracted residue mixture, then incubating at 45° C.-60° C. for 5 hours to create a first after incubated mixture; wherein microorganism ingredient having 0.05% of the weight of the extracted residue mixture; wherein the extracted residue mixture comprising: the extracted waste tobacco residues, the extracted plant mixture residue, the treated peat residue, a coffee husks and cocoa shells mixture residue, a pectin-reduced yams residue, and a pectin-reduced okra residue;

(iii) admixing the base mixture, the first after incubated mixture, and the microorganism ingredient in the ratio of 90:10:1, then incubating at 45° C.-60° C. for 25-28 days with humidity of 60%-65%, with the combination of mixing frequency every one day for 20 minutes; that to create a second after incubated mixture having a chemical components comprising: an elemental nitrogen (N) having 1.77% by weight; an elemental phosphorus (P) having 0.69% by weight; an elemental potassium (K) having 5.4% by weight; an elemental sulfur (S) having 0.39% by weight; an elemental bo (B) having 0.0409% by weight; an elemental calcium (Ca) having 2.82% by weight; an elemental magnesium (Mg) having 0.49% by weight; an elemental copper (Cu) having 0.0024% by weight; an elemental zinc (Zn) having 0.0047% by weight; an elemental manganese (Mn) having 0.0149% by weight; an elemental iron (Fe) having 0.119% by weight; nitrogen-fixing microorganisms having $1.1 \times 10^6$ CFU/g; phosphate solubilizing microorganisms (PSMs) having $2.1 \times 10^5$ CFU/g; cellulose-degrading microorganisms having $7.1 \times 10^5$ CFU/g; humic acid having 2.09% by weight; and organic matter having 86.5% by weight;

wherein the chelation of trace elements solution having 5%-7% of the weight of the fertilizer mixture;

wherein the water-retaining ingredient having 7%-10% of the total weight of the fertilizer mixture, and the chelation of trace elements solution;

wherein the plant extracts ingredients having anti-insect properties having 0.08%-3% of the total weight of the fertilizer mixture, with the chelation of trace elements solution, and the water-retaining ingredient.

12. The multipurpose fertilizer composition of claim 11, wherein the pectin extract from coffee husks and cocoa shells created by performed in a specific order from (a") to (d") comprising:

(a") collecting coffee husks and cocoa shells in a ratio of 2:1; then washing, cutting, drying, and grinding to create a powder mixture having moisture content of 10%-13%;

(b") hydrolyzing 1 part the powder mixture with 20 parts $H_2SO_4$ acid including two stages:

stage 1: soaking 1 part the powder mixture with 15 parts $H_2SO_4$ acid at 80° C. for 1.5 hours, with the combination of stirring, and maintain pH of 1.5;

stage 2: adding 5 parts of $H_2SO_4$ acid for continue soaking at 50° C. for 1 hour, maintain pH of 1.5, with the combination of stirring, then filtering to create a first filtrate and a residue;

(c") hydrolyzing 1 part the residue at step (b") with 10 parts acetic acid including two stages:

stage 1: soaking 1 part the residue with 7 parts acetic acid at 80° C. for 45 minutes, with the combination of stirring, and maintain pH of 2;

stage 2: adding 3 parts of acetic acid for continue soaking at 40° C. for 30 minutes, with the combination of stirring, and maintain pH of 2; then filtering to obtain a second filtrate, and a coffee husks and cocoa shells mixture residue with the pectin removed; and (d") centrifuging a mixture of the first filtrate at step (b") and the second filtrate at step (c") with 3000-3500 rpm for 15 minutes to create the pectin extract from coffee husks and cocoa shells.

13. The multipurpose fertilizer composition of claim 11, wherein the pectin extract from yam (*Dioscorea alata* L.) created by performed in a specific order from (i') to (v') comprising:

(i') selecting yams (*Dioscorea alata* L.) that are not crushed or rotten; then washing them with water to remove impurities;

(ii') peeling off the outer skin, crushing, stirring for 5-10 minutes, then filtering by filter cloth to create a first yams residue;

(iii') drying the first yams residue at 70° C.-80° C. for 20-24 hours to create a yams of powder having moisture content of 10%-13%;

(iv') hydrolyzing 1 part of the yams of powder with 20 parts of $H_2SO_4$ acid solution including two stages:

stage 1: soaking 1 part of the the yams of powder with 15 parts of $H_2SO_4$ acid at 80° C. for 1.5 hours, with the combination of stirring, and maintain pH at 1.5;

stage 2: adding 5 parts of $H_2SO_4$ acid for continue soaking at 50° C. for 1 hour, with the combination of stirring, and maintain pH at 2, then filtering to create a first yams filtrate, and a second yams residue;

(v') hydrolyzing 1 part of the second yams residue with 10 parts acetic acid including two stages:

stage 1: soaking 1 part the second yams residue with 7 parts of acetic acid at 80° C. for 45 minutes, with the combination of stirring, and maintain pH at 2;

stage 2: adding 3 parts of acetic acid for continue soaking at 40° C. for 30 minutes, with the combination of stirring, and maintain pH at 2, then filtering to create a second yams filtrate, and a pectin-reduced yams residue;

(vi') centrifuging a mixture of the first yams filtrate at step (iv') and the second yams filtrate at step (v') with 3000-3500 rpm for 15 minutes to create the pectin extract from yam.

14. The multipurpose fertilizer composition of claim 11, wherein the pectin extract from okra (*Abelmoschus esculentus* (L.) Moench) created by performed in a specific order from (i") to (v") comprising:

(i") cutting okra (*Abelmoschus esculentus* (L.) Moench) into thin slices 1-5 mm thick, then admixing with water in the ratio 1:1 to create a okra mixture;

(ii") adjusting the pH of the okra mixture to 5.5, then adding 0.1% pectinase enzyme, and incubating at 45° C. for 30 minutes;

(iii") filtering said the incubated okra mixture to obtain a okra residue, and a first temporary filtrate;

(iv") hydrolyzing 1 part of first temporary filtrate with 8 parts of $HNO_3$ acid including two stages:

stage 1: soaking 1 part of the okra residue with 5 parts of $HNO_3$ acid at 60° C. for 45 minutes, with the combination of stirring, and maintain pH at 1.5;

stage 2: adding 3 parts of $HNO_3$ acid for continue soaking at 30° C. for 30 minutes, with the combination of stirring, and maintain pH at 2, then filtering to obtain a second temporary filtrate, and a pectin-reduced okra residue; and (v") centrifuging a mixture of the first temporary filtrate at step (iii") and the second temporary filtrate at step (iv") with 3000-3500 rpm for 15 minutes to create the pectin extract from okra.

15. The multipurpose fertilizer composition of claim 11, wherein the fertilizer mixture comprising one part the base fertilizer, two parts the NPK fertilizer, and 0 part the foundation fertilizer.

16. The multipurpose fertilizer composition of claim 11, wherein the fertilizer mixture comprising 0 part the base fertilizer, two parts the NPK fertilizer, and one part the foundation fertilizer.

17. The multipurpose fertilizer composition of claim 11, wherein the fertilizer mixture comprising two parts the base fertilizer, 0 part the NPK fertilizer, and one part the foundation fertilizer.

18. The multipurpose fertilizer composition of claim 11, wherein the fertilizer mixture comprising one part the base fertilizer, one part the NPK fertilizer, and one part the foundation fertilizer.

19. The multipurpose fertilizer composition of claim 11, wherein the plant extracts ingredients having anti-insect properties further comprising an neem leaf extracts; wherein the neem leaf extracts extracted from fresh neem leaves (*Azadirachta indica*) crushed/chopped/or not chopped, immersed are soaked in solvent, or saturated brine solution.

20. The multipurpose fertilizer composition of claim 11, wherein the plant extracts ingredients having anti-insect properties further comprising a chinaberry leaf extracts; wherein the chinaberry leaf extracts extracted from fresh neem leaves (*Melia azedarach*) crushed/chopped/or not chopped, immersed are soaked in solvent, or saturated brine solution.

\* \* \* \* \*